United States Patent
Mayer

[11] 4,074,242
[45] Feb. 14, 1978

[54] POINT SELECTION AND DISPLAY SYSTEM

[75] Inventor: Robert Mayer, Ardmore, Pa.

[73] Assignee: Suntech, Inc., Wayne, Pa.

[21] Appl. No.: 634,691

[22] Filed: Nov. 24, 1975

[51] Int. Cl.² .............................................. H04Q 9/00
[52] U.S. Cl. ............................. 340/213.1; 340/213 Q; 340/412; 340/147 LP
[58] Field of Search ................ 340/213.1, 213 Q, 412, 340/52 F, 151, 147 LP

[56] References Cited
U.S. PATENT DOCUMENTS

| | | | |
|---|---|---|---|
| 3,290,667 | 12/1966 | Stine ...................................... | 340/184 |
| 3,543,266 | 11/1970 | Morris .................................... | 340/412 |
| 3,611,295 | 10/1971 | Sharp ..................................... | 340/167 |
| 3,641,539 | 2/1972 | Lesher .................................... | 340/412 |
| 3,714,646 | 1/1973 | Nurnberg et al. ................. | 340/213.1 |
| 3,913,069 | 10/1975 | Rundin et al. .................. | 340/147 LP |

*Primary Examiner*—John W. Caldwell, Sr.
*Assistant Examiner*—Donnie L. Crosland
*Attorney, Agent, or Firm*—J. Edward Hess; Donald R. Johnson; James H. Phillips

[57] ABSTRACT

A point selection and display system for monitoring various parameters of a process, which enables the operator to select the particular parameters which are to be monitored and to select the particular display panel on which the value of each parameter is to be indicated. Also included in this system is an identification code system for indicating which parameter is being monitored by the particular display panel. The switching circuit used within this system is designed to permit the use of as many display panels as are necessary and enables the system to monitor as many process parameters as may be desired.

7 Claims, 2 Drawing Figures

POINT SELECTION AND DISPLAY SYSTEM

BACKGROUND OF THE INVENTION

This invention is related to systems for monitoring various parameters within a given process and more specifically to a monitoring system which permits the operator to select the particular process parameter to be monitored and the particular display panel upon which the value of the parameter will be indicated as well as a code for identifying the particular parameter.

When operating complicated processes, such as refining petroleum products, it is often desirable to have a system which enables the operator to monitor any one of the various process parameters. Such a system should have the flexibility to permit the operator to easily choose the parameters and the panel for displaying their values. Identification of the particular parameter being displayed is also helpful in order to avoid confusion between the different parameters. The monitoring system should also be flexible enough to permit the easy addition of circuits to monitor more parameters and of more display panels. Most of the currently available systems which perform these functions tend to be unnecessarily complicated and, as a result, can be quite expensive.

SUMMARY OF THE INVENTION

In accordance with a preferred embodiment, a point selection and display system is provided which monitors any number of process parameters and displays any parameter desired on the panel selected by the operator. Also included within the display system is an identification system which indicates what parameter the operator is monitoring on the selected display panel at that particular time. The particular circuit design permits an unlimited number of system parameters to be monitored as well as an unlimited number of display panels to be used for indicating the identification codes and values of the different parameters.

The circuit design includes a matrix of individual switching circuits connecting each parameter to each display panel. Each switching circuit associated with a particular display panel is designed to be placed in a first mode, responsive to a signal from that display panel, which causes the parameter input terminal selected to be connected to that display panel and all the other switching circuits associated with that display panel to be placed in a condition which prevents any interference with the parameter being displayed.

A better understanding of the invention and its advantages will become more apparent in the following description of the figures and the preferred embodiment.

DESCRIPTION OF THE FIGURES AND PREFERRED EMBODIMENT

Figure 1:
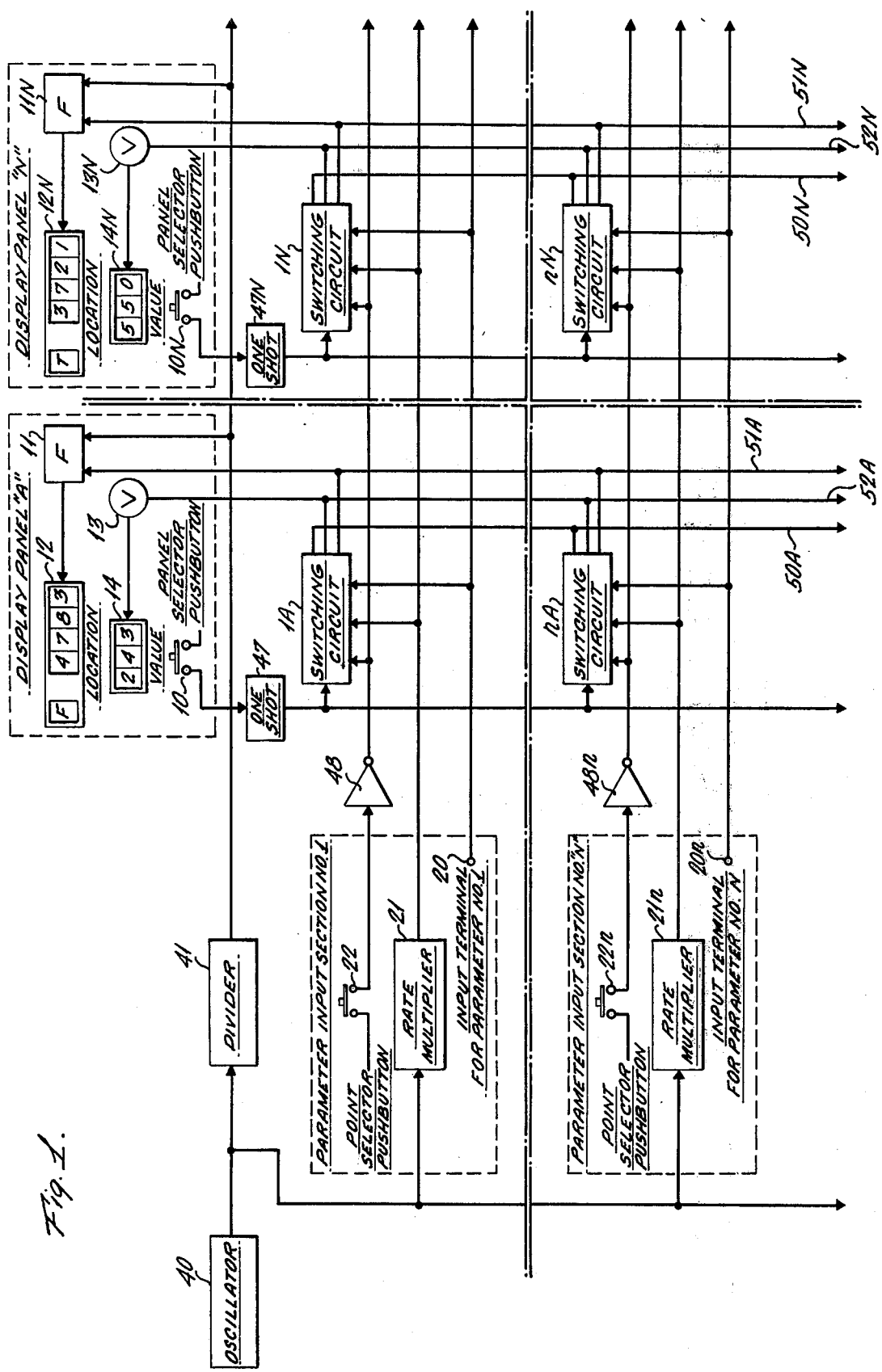
FIG. 1 is a schematic diagram of the point selection and display system, according to this invention, for monitoring two process parameters and having two display panels.

The point selection and display system is designed to enable a process operator to monitor the various process parameters by providing a switching circuit which permits the operator to select the panel for displaying the value of the parameter and then to select the parameter, the value of which is to be displayed on the panel selected. Referring to FIG. 1, this system basically comprises a series of input sections, one for each parameter to be monitored, and a series of display panels connected together through a matrix of individual switching circuits in which each input section is connected to each display panel through a switching circuit. The use of the term "matrix" refers to the electrical interconnection of the elements comprising the monitoring system and does not refer to any particular geometric structure of the system elements.

The switching circuits are designed so that when a particular display panel is selected, all of the individual switching circuits associated with this panel are placed in the "reset" mode. When the appropriate parameter is selected by pressing its point selector pushbutton, its value and identification code are connected to the display panel previously selected through the switching circuit associated with both the selected panel and parameter. The remaining switching circuits are then placed back into the "set" mode so that the selection of any other parameters does not interfere with the readings currently being displayed on the panel. The operator must alway use this sequence of clearing the selected display panel and then choosing the parameter for proper operation of the system. In fact, the system is designed so that no other sequence will affect the parameter values being displayed.

A more specific explanation of the system components now follows. Each display panel, A, "N", has a panel selector push button 10, 10N, a frequency counter 11, 11N, with a five-decade frequency counter digital readout 12, 12N, and a voltmeter 13, 13N, with a voltmeter digital readout 14, 14N, respectively. Each input section, No. 1, No. "n", has an input terminal 20, 20n, for receiving an analog signal of parameter No. 1, No. n, a five-decade frequency rate multiplier 21, 21n, and a parameter selector push button 22, 22n, respectively. The use of the letters "N" and "n" signify that the monitoring circuit can be expanded both to the left and downward in a similar fashion to that illustrated.

The analog signal for each parameter which is received by input terminals 20 is pre-conditioned such that the value which appears on readout 14 of voltmeter 13 corresponds to the proper engineering unit of the parameter presently being monitored. For example, if monitoring the temperature of one part of a process which has a range of 500° C to 1000° C, the analog input signal for this parameter would be conditioned such that readout 14 of voltmeter 13 would read from 500 to 999. Systems which perform this conditioning function are well known and are not included within the scope of this invention.

Each frequency rate multiplier 21 is set at its own particular constant value for multiplying the signal received from oscillator 40, so that a different identification frequency is produced for each parameter. This identification frequency is indicated on readout 12 of frequency counters 11 so that the operator can identify the parameter being monitored by a particular panel. Frequency counter 11 receives a reference signal from oscillator 40 which has been divided by a constant frequency in divider 41.

An operational feature which can be included in the identification circuit is to designate the fifth ordered digit on readout 12 as a "units" indicator and have it indicate a letter symbol for the particular type of process variable, such as "P" for pressure, "T" for temperature, "F" for flow rate, and "L" for liquid level. With this option, the operator knows the value and location as well as the type of parameter being monitored.

Figure 2:
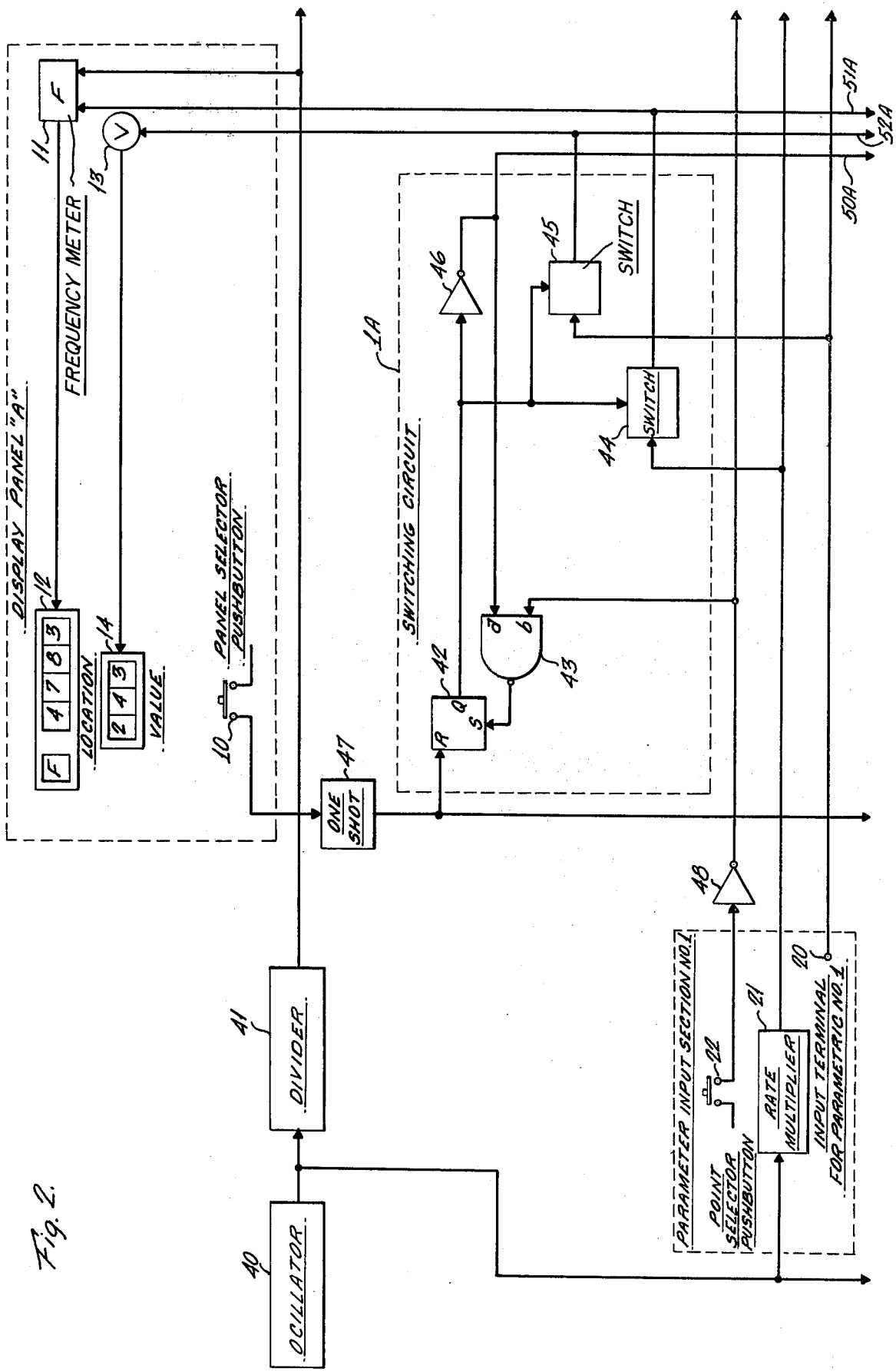
FIG. 2 is a more detailed drawing showing the components of the switching system illustrated in FIG. 1.

The switching circuits which are interfaced between the display panels and the input sections will now be discussed. In FIG. 2, the components of switching circuit 1A and its connections to Input Section No. 1 and Display Panel A are illustrated in detail. The other switching circuits also contain the same components and are connected to their respective Input Sections and Display Panels in a like manner and function in a like manner. In the figures, the first digit in the switching circuit number indicates the parameter input section it is connected to, and the second digit indicates the display panel it is connected to.

The general operation of switching circuit 1A will now be described. Before a new parameter selection is made, the value of the previously selected parameter and its identification code are indicated on Display Panel A. All the switching circuits associated with Display Panel A are in the "set" mode, which includes having the input terminal "a" of all the NAND gates for each switching circuit conditioned to prevent any output signal from the NAND gate upon receiving a signal at input terminal "b" by virtue of each input terminal "b" for each switching circuit being connected together by lead 50A. When Panel Selector Pushbutton 10 is pressed, a pulse is created which is shaped by one-shot multi-vibrator 47 and received at the "reset" terminal of flip-flop circuit 42 and at each flip-flop circuit for all the switching circuits, nA, associated with Display Panel A. Since the flip-flop circuits are used to perform a latching function, the flip-flop circuit for the switching circuit connecting the parameter previously being monitored by Display Panel A is properly conditioned so that the value of its "Q" terminal changes, thereby opening the switches associated therewith and conditioning the "a" terminal of all the NAND gates of the switching circuits associated with display panel "A" so that upon receiving a pulse created by pressing their respective Point Selector Pushbutton an output pulse is produced by NAND gate 43 which causes switches 44 and 45 to close. The value on frequency counter readout 12 and voltmeter readout 14 now go to zero since frequency counter 11 and voltmeter 13 are not receiving any signals. Once Point Selector Pushbutton 22 is pressed, the pulse received by the terminal "b" of NAND gate 43 causes an output pulse which is received by the "set" terminal of flip-flop circuit 42, which then produces a pulse to close switches 44 and 45, and also conditions the "a" terminal of NAND gate 43 and of each NAND gate of the Switching Circuits nA so that no output from the NAND gate is produced by receiving a signal on the "b" terminal. The output of rate multiplier 21 is now connected to frequency counter 11 through switch 44 and lead 51A, and the analog input terminal 20 is now connected to voltmeter 13 through switch 45 and lead 52A. The values currently being displayed on Display Panel A cannot now be interfered with by pressing other Point Selector Push buttons without clearing the selected Display Panel first. This feature also assures that when Point Selector Push button 22 is pressed, the readings on Display Panels N are not also interfered with.

The point selection and display system design includes a practical switching system as well as other convenience features. Use of the rate multiplier for parameter identification permits the identification code to be easily changed if that particular input section is connected to monitor a different parameter. Addition of more input sections is a simple matter since individual switching circuits can be easily connected to the existing system without any modification of the existing circuitry. The identification system continuously informs the operator what parameter he is monitoring. Each switching circuit is designed so that the parameter being displayed by its respective display panel is not interfered with until it is appropriately cleared, so the operator knows what parameter he is monitoring and that no other system is interfering with the reading for that parameter.

The exact elements that can be used to perform the functions described above are not critical since conventional components are adequate. Switches 44 and 45 are preferably solid state switches which obtain high and low impedances to provide open and closed positions. These devices are available from the RCA company under the part number 4066 AD.

While a particular embodiment of this invention has been shown and described, it is obvious that changes and modifications can be made without departing from the true spirit and scope of the invention. It is the intention of the appended claims to cover such changes and modifications.

The invention claimed is:

1. A system for monitoring the value of a plurality of parameters at different locations in a process and for displaying at a central location the value of the process parameters selected, said monitoring system comprising:
   (a) a plurality of input terminals, each input terminal receiving a signal related to the value of a particular process parameter, and each input terminal having associated therewith parameter selection means for allowing that input terminal to be selected to monitor its process parameter, and for producing a signal indicative of its selection;
   (b) a plurality of display systems, each display system having means for displaying the value of a selected process parameter, and each display system having associated therewith display system selection means for allowing that display system to be selected to display the value of a selected parameter, and for producing a signal indicative of its selection;
   (c) a matrix of switching circuits, each switching circuit coupling an input terminal with a display system, and each switching circuit comprising,
      (i) means, responsive to a signal from the display system selection means associated with that switching circuit, for placing the switching circuit in a first enabled mode wherein an open circuit is produced between the input terminal and the displaying means, whereby all the switching circuits coupled to a particular display system are placed in a first enabled mode,
      (ii) means, responsive to the switching circuit being placed in said first enabled mode and further responsive to a signal from the process parameter selection means associated with that switching circuit, for placing the switching circuit in a second mode wherein a closed circuit is produced between the input terminal and the displaying means, and the value of the selected process parameter is displayed by the displaying means of the selected display system.

2. The system recited in claim 1, wherein each switching circuit further comprises means, responsive to another switching circuit, associated with the same display system, being placed in its second mode, for disabling that switching circuit, thereby assuring that only one switching circuit of the plurality of switching circuits coupled to a particular display system is in a second mode at any one point in time.

3. The system recited in claim 2, wherein each switching circuit includes:
 (a) means, responsive to a signal from the display system selection means associated with that switching circuit, for producing a first command signal;
 (b) means, responsive to a signal from the process parameter selection means associated with that switching circuit, for producing a second command signal; and
 (c) a switching device, responsive to the first command signal for producing an open circuit between the input terminal and displaying means associated with that switching circuit, and responsive to the second command signal for producing a closed circuit between the input terminal and displaying means associated with that switching circuit.

4. The system recited in claim 3, wherein the first and second command signal producing means includes a bistable device.

5. The system recited in claim 2, wherein each switching circuit includes:
 (a) means, responsive to a signal from the display system selection means associated with that switching circuit, for producing a first command signal;
 (b) a switching device, responsive to the first command signal, for producing an open circuit between the input terminal and the displaying means associated with that switching circuit;
 (c) gating means, responsive to the switching devices of the switching circuits coupled to the same display system and to a signal from the process parameter selection means associated with that switching circuit, for producing an actuating signal only when all of said switching devices produce an open circuit and upon receipt of a signal from the process parameter selection means associated with that switching circuit, whereby no actuation signal will be produced in the event any of said switching devices is in its closed circuit condition; and
 (d) means, responsive to an actuating signal from the gating means, for producing a second command signal, so that the switching device produces a closed circuit between the input terminal and displaying means associated with that switching circuit in response to the second command signal.

6. The system recited in claim 5, further including means for providing an identification code on each display system to indicate the parameter being monitored, said means comprising:
 (a) means for producing an identification signal for each input terminal;
 (b) means, included with each display system and responsive to an identification signal, for displaying an identification code; and
 (c) a second switching device for each switching circuit, said second switching device being responsive to the first command signal for producing an open circuit between the identification signal producing means and identification code displaying means, and responsive to the actuation signal for making a closed circuit, wherein the value of the selected process parameter and its identification code are simultaneously shown on the selected display system.

7. The system recited in claim 6, wherein the identification signal producing means comprises:
 (a) an oscillator for producing a reference signal having a predetermined frequency; and
 (b) a plurality of multiplying means for changing the frequency of the reference signal by a predetermined constant to obtain an identification signal having a set frequency, wherein the predetermined constant is different for each input terminal.

* * * * *